March 30, 1937.   A. W. SIZER   2,075,476
MACHINE FOR MOLDING PLASTIC SUBSTANCES
Filed Jan. 4, 1936
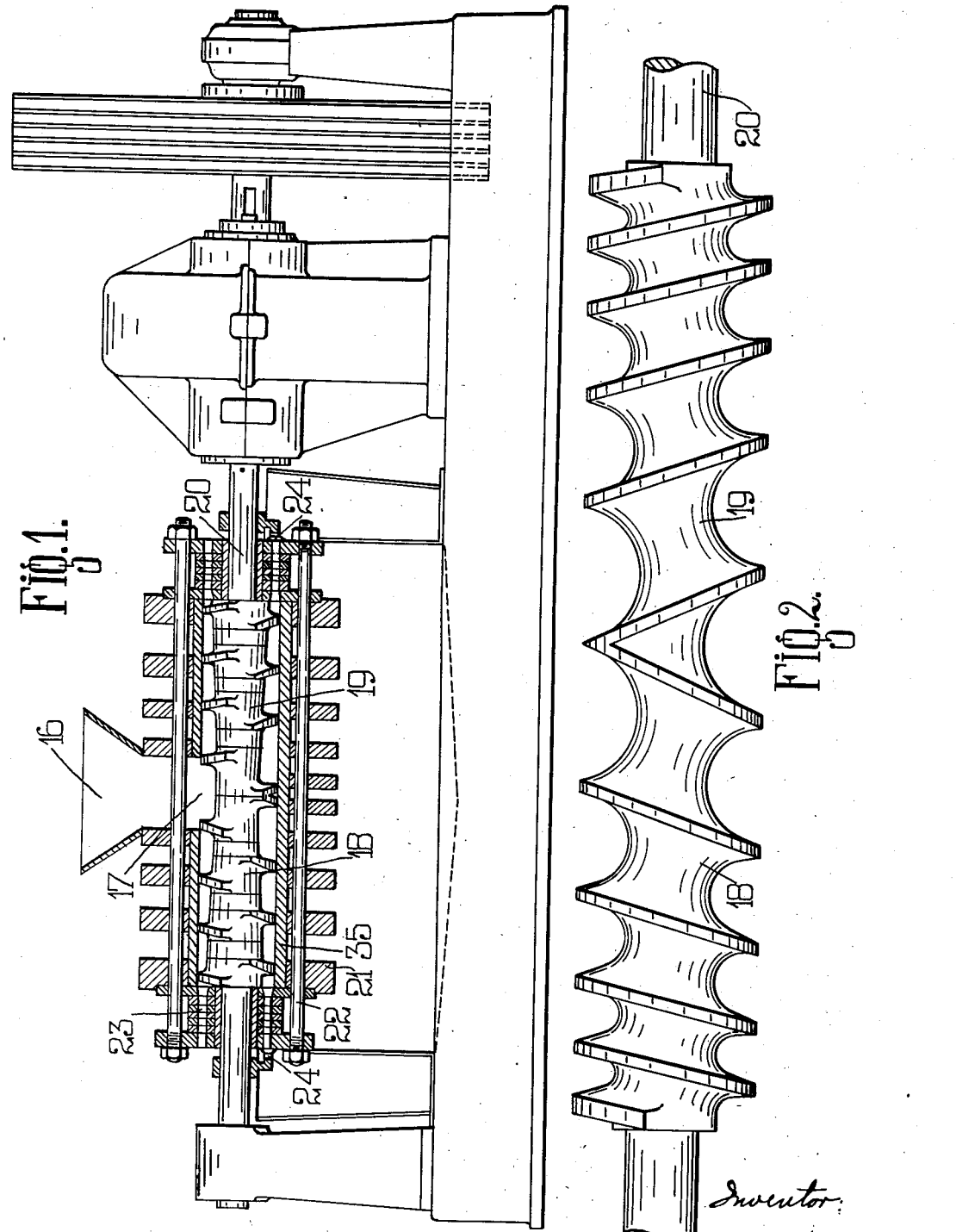

form of construction.
UNITED STATES PATENT OFFICE 2,075,476

MACHINE FOR MOLDING PLASTIC SUBSTANCES

Albert William Sizer, Hessle, Kingston-upon-Hull, England

Application January 4, 1936, Serial No. 57,586
In Great Britain January 8, 1935

1 Claim. (Cl. 107—14)

The present invention relates to improvements in machines for the molding of plastic substances, mixing machines, continuous crushing or expelling machines, and the like, of the type in which material is compressed within a chamber by means of a rotary worm element therein.

According to the present invention, a compression chamber is provided with a worm element having right- and left-hand pitch threading, extending from the centre to the ends respectively, and with a common inlet for material to be compressed at the centre of the said chamber.

The chamber may be provided with die plates at opposite ends for the extrusion of compressed material therethrough or alternatively, or additionally, with perforations in the chamber walls for the escape of liquid, such as oil expressed from material, such as seed treated by the machine.

The invention is more particularly described with reference to the accompanying drawing in which:—

Figure 1 is a view in elevation of a modified form of construction.

Figure 2 is a detail view on an enlarged scale of a worm element.

The machine shown is particularly suitable for the making of compressed cakes from meal mixtures or seeds, and the expressing of oil therefrom. Seeds or the like material fed to a hopper 16 pass into a chamber 17 containing right- and left-hand feed worm 18, 19, which is shown in Figure 1 may be formed of sections individually keyed to the driving shaft 20 and either having a continuous thread or displaced thread sections as shown, or may be integral with the driving shaft as shown in Figure 2, the pitch of the threads in each case either being constant from the centre to the ends respectively, or of decreasing pitch as shown in Figure 2.

The compression chamber is formed of a plurality of staves 35 assembled and held in position by rings 21 and bars 22, also serving to support end plates 23, which may be provided either with an opening to allow discharge of the compressed material, or, as in the arrangement shown, with perforations for the extrusion of material in the form of pellets or cakes to be severed by the rotating knives 24.

The worm sections may be symmetrical relatively to the centre line, so that when for instance, meal is being extruded from the top of one die plate it is also being extruded at the top of the other die plate, thus fully balancing the pressure between the two worm sections. It is obvious however, that the thrust might be distributed angularly differentially on one worm section to the other. Normally it will be preferable to set the two worms 180° out of phase relatively to one another. The worms may be either single or multiple start as desired.

I declare that what I claim is:—

A machine for treating plastic substances comprising a compression chamber, a single feed inlet centrally disposed with respect to said chamber, die plates closing opposite ends of said chamber, a right- and left-hand worm within said chamber, and means for periodically severing extruded material from said die plates.

ALBERT WILLIAM SIZER.